US012684061B2

(12) United States Patent
Oizumi et al.

(10) Patent No.: US 12,684,061 B2
(45) Date of Patent: Jul. 14, 2026

(54) SETTING SYSTEM FOR MOBILE COMMUNICATION TERMINAL AND METHOD THEREFOR

(71) Applicant: FREEBIT CO., LTD., Tokyo (JP)

(72) Inventors: Hiroshi Oizumi, Tokyo (JP); Masahiro Fujiwara, Tokyo (JP); Atsuki Ishida, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 351 days.

(21) Appl. No.: 18/548,066

(22) PCT Filed: Feb. 25, 2022

(86) PCT No.: PCT/JP2022/007837
§ 371 (c)(1),
(2) Date: Aug. 25, 2023

(87) PCT Pub. No.: WO2022/181757
PCT Pub. Date: Sep. 1, 2022

(65) Prior Publication Data
US 2024/0146837 A1     May 2, 2024

(30) Foreign Application Priority Data
Feb. 27, 2021    (JP) ................................. 2021-031278

(51) Int. Cl.
*H04M 1/72448*     (2021.01)
*H04L 9/40*     (2022.01)
(Continued)

(52) U.S. Cl.
CPC .... *H04M 1/72448* (2021.01); *H04L 63/0853* (2013.01); *H04W 12/06* (2013.01); *H04W 12/40* (2021.01)

(58) Field of Classification Search
CPC ......... H04W 8/183; H04W 4/50; H04W 8/18; H04W 8/205; H04W 12/06; H04W 12/40;
(Continued)

(56) References Cited

U.S. PATENT DOCUMENTS 10,021,558 B2    7/2018  Lalwaney
10,021,588 B1    7/2018  Yang
(Continued)

FOREIGN PATENT DOCUMENTS

CN         107122266 A       9/2017
EP          3716656 A1 *    9/2020    ............ H04W 8/205
(Continued)

OTHER PUBLICATIONS

Koshy et al., "Evolution of SIM Cards—What's Next?", IEEE Xplore, 2018, 5 pages (Year: 2018).*
(Continued)

*Primary Examiner* — Quoc Thai N Vu
(74) *Attorney, Agent, or Firm* — Thorpe North & Western, LLP.; David W. Osborne

(57)     ABSTRACT

[Problem] The purpose of this invention is to provide a system and a method that enable settings required in communication devices such as smart phones. [Solution] Provided is a communication device setting system 14 for making setting of a communication device 4 mounting a SIM card 3, the system being configured to make a computer execute: (1) a setting data receiving step S1 for receiving, from the communication device 4 mounting the SIM card 3, a request of setting data for setting the communication device; (2) a user attribute specifying step S2 for specifying, on the basis of unique information of the SIM card 3 contained in the request, attribute information of a user of the SIM card 3; (3) a setting data inference step S3 for applying the specified attribute information of the user to an
(Continued)

inference model to determine the setting data of the communication device 4; and (4) a setting data transmission step S4 for transmitting the determined setting data to the communication device 4.

18 Claims, 4 Drawing Sheets

(51) Int. Cl.
    *H04W 12/06*       (2021.01)
    *H04W 12/40*       (2021.01)
(58) Field of Classification Search
    CPC ........... H04W 8/20; H04W 8/22; H04W 8/24;
               H04W 8/265; H04L 63/0853; H04L
               67/303; H04L 67/306; H04L 41/0803;
             H04M 1/72406; H04M 3/42144; H04M
                    3/42153; H04M 1/72448
    See application file for complete search history.

(56) References Cited

U.S. PATENT DOCUMENTS

| | | | |
|---|---|---|---|
| 11,115,810 B1 * | 9/2021 | Indurkar | .............. H04W 12/72 |
| 2019/0098488 A1 | 3/2019 | Syed et al. | |

| | | | |
|---|---|---|---|
| 2020/0037153 A1 * | 1/2020 | Anand | .................. H04W 12/35 |
| 2020/0092711 A1 | 3/2020 | Chen et al. | |
| 2023/0239681 A1 * | 7/2023 | Sääskilahti | ........... H04W 8/205 |
| | | | 455/418 |

FOREIGN PATENT DOCUMENTS

| | | | |
|---|---|---|---|
| JP | 2008-206061 A | 9/2008 |
| JP | 2013222216 A | 10/2013 |
| JP | 2017097752 A | 6/2017 |
| JP | 2019-125163 A | 7/2019 |
| WO | 2016-002969 A1 | 1/2016 |

OTHER PUBLICATIONS

Final Office Action issued by the Japan Patent Office on May 27, 2025 for patent application No. JP2020-560010.
First Office Action issued by the China National Intellectual Property Administration on Nov. 28, 2025 for Chinese Patent Application No. 202280017241.X.

* cited by examiner

User Information

| SIM card information | Subscriber attribute information | User attribute information | User setting information (Items/Setting values) |
|---|---|---|---|
| | | | |

FIG. 3

Teacher Data

| User settings | Setting items |
|---|---|
| User 1 setting | Item 1, Item 2, Item 4 |
| User 2 setting | Item 3, Item 4, Item 5 |
| ⋮ | ⋮ |

FIG. 4

S1 — Receive request for setting data from communication terminal

S2 — Identify user attribute based on unique information of SIM card/authenticate communication terminal S3 — Infer setting data based on user attribute S4 — Transmit inferred setting data to communication terminal

SETTING SYSTEM FOR MOBILE COMMUNICATION TERMINAL AND METHOD THEREFOR

FIELD OF THE INVENTION

The present invention relates to a setting system and method for setting a communication terminal with a SIM card mounted thereon.

BACKGROUND OF THE INVENTION

So-called "smart phones" are hand-held computers with telephone communication functions, in which a universal mobile operating system (OS) such as Android® or IOS®, for example, is installed.

In recent years, smartphone models and functions have become increasingly diversified and sophisticated in response to the required applications. Accordingly, a certain level of knowledge about not only smartphones but also computers and networks is required to configure initial settings and setting changes for smartphones.

SUMMARY OF THE INVENTION

Problem to be Solved by the Invention

However, in recent years, the forms of sales of smartphones have become increasingly diversified, including mail-order sales over the Internet, etc. In online sales in particular, store staff is unable to set up smartphones with subscribers, making it difficult for the subscribers to properly set up their phones.

In addition, even when settings are configured at a store, not all necessary settings can be configured, and also it is difficult to configure appropriate settings, depending on how crowded a store is as well as the skill levels of the store staff The present invention was made in view of these circumstances, and the purpose of the present invention is to provide a system capable of configuring necessary settings for communication devices such as smartphones and a method therefor.

Means for Solving the Problem

In order to achieve the above object, this invention provides the following configurations.

(1) A communication device setting system for setting a communication device with a SIM card mounted thereon, the system being configured to cause a computer to execute:

a setting data receiving step for receiving, from the communication device with the SIM card mounted thereon a request for setting data for setting the communication device;

a user attribute identification step for identifying attribute information of a user of the SIM card based on unique information of the SIM card included in the request;

a setting data inference step for applying the identified attribute information of the user to an inference model to determine setting data for the communication device by; and a setting data transmission step for transmitting the determined setting data to the communication device.

According to this configuration, it is possible to configure the settings of a communication device with a SIM card mounted thereon, based on the data stored in the issued SIM card and the subscriber/user information, and when the settings are being configured, the setting data is obtained through inference using an inference model so that the optimal setting data can be obtained based on the attributes of the subscriber/user.

(2) The communication device setting system of (1), wherein in the user attribute identification step, the computer authenticates the SIM card, and identifies the attributes of the user, the system further comprising:

a user database for storing information of SIM card subscribers and users for the authentication and the identification.

(3) The communication device setting system of (1), wherein the system is configured to cause the computer to further execute an inference model generation step for generating and updating the inference model used in the setting data inference step.

(4) The communication device setting system of (3), further comprising teacher data for generating the inference model in the inference model generation step, wherein the teacher data includes data of setting items and setting values of the communication device set by a plurality of SIM card users.

(5) The communication device setting system of (4), wherein the system is configured to cause the computer to further execute a user data collection step for collecting the data of setting items and setting values of the communication device set by the SIM card users.

(6) The communication device setting system of (5), wherein the setting items and the setting values of the communication device is collected from service servers on the Internet in the user data collection step.

(7) The communication device setting system of (5), wherein the system is configured to cause the computer to further execute a teacher data generation step for continuously updating the teacher data based on the setting items and the setting values collected in the user data collection step.

(8) The communication device setting system of (1), wherein the setting data are setting items and setting values related to a home screen.

(9) The communication device setting system of (1), wherein the setting data are setting items and setting values related to a tracking app/service for tracking behavior of the user of the communication device.

(10) The communication device setting system of (1), further comprising:

a communication device side setting system installed in the communication device, the communication device side setting system being configured to cause a computer to execute the steps of:

requesting setting data from the communication device setting system; and setting the communication device based on the setting data received from the communication device setting system.

(11) The communication device setting system of (1), the communication device is an IoT device capable of mobile communications by itself.

(12) A method executed by a communication device setting system for setting a communication device with a SIM card mounted thereon, the method comprising:

(1) a setting data receiving step for receiving by a computer, a request from the communication device with the SIM card mounted thereon for setting data for setting the communication device;

(2) a user attribute identification step for identifying by the computer, attribute information of a user of the SIM card based on unique information of the SIM card included in the request;

(3) a setting data inference step for applying by the computer, the identified attribute information of the user to an inference model to determine setting data for the communication device by; and (4) a setting data transmission step for transmitting by the computer, the determined setting data to the communication device.

(13) The method of (12), wherein in the user attribute identification step, the computer authenticates the attributes of the user from a user database for identifying the attributes of the user of the SIM card.

(14) The method of (13), further comprising an inference model generation step for generating and updating by the computer, the inference model used in the setting data inference step.

(15) The method of (14), wherein the inference model generation step comprises teacher data used for generating the inference model by the computer, wherein the teacher data includes data of setting items and setting values of the communication device set by a plurality of SIM card users.

(16) The method of (15), further comprising a user data collection step for collecting by the computer, the data of setting items and setting values of the communication device set by the SIM card users to generate the teacher data.

(17) The method of (16), wherein the setting items and the setting values of the communication device is collected from service servers on the Internet in the user data collection step.

(18) The method of (16), further comprising teacher data generation step for continuously updating by the computer, the teacher data based on the setting items and the setting values collected in the user data collection step.

(19) The method of (12), wherein the setting data are setting items and setting values related to a home screen.

(20) The method of (12), comprising a method executed by a communication device side setting system installed in the communication device, the method comprising the steps of:

requesting by a computer, setting data from the communication device setting system; and setting by the computer, the communication device based on setting data received from the communication device setting system.

Other features of the present invention that are not recited in the above claims will be apparent in the best mode of carrying out the present invention and in the drawings that follow.

BRIEF DESCRIPTION OF THE DRAWINGS

FIG. 3 is a conceptual diagram that illustrates the contents of user information stored in a user database in accordance with the one embodiment of the present invention.

FIG. 4 is a conceptual diagram that illustrates the contents of teacher data in accordance with the one embodiment of the present invention.

DETAILED DESCRIPTION OF THE INVENTION

One embodiment of the present invention will be described below with reference to the drawings.

This embodiment illustrates an exemplary case where SIM cards are provided by an MVNO operator, i.e., Mobile Virtual Network Operator. It is also equally applicable to a case where a Mobile Network Operator (hereinafter referred to as an "MNO") implements the same.

An MVNO operator is an operator that does not own its physical mobile network, but borrows it from an MNO operator that actually owns such a network and provides telecommunication services under its own brand.

For convenience in explaining the present invention, an example of a data communication environment in which a SIM card of an MVNO operator is used will be described below, first with reference to FIG. 1.

Data Communication Configuration Using a SIM Card

Figure 1:
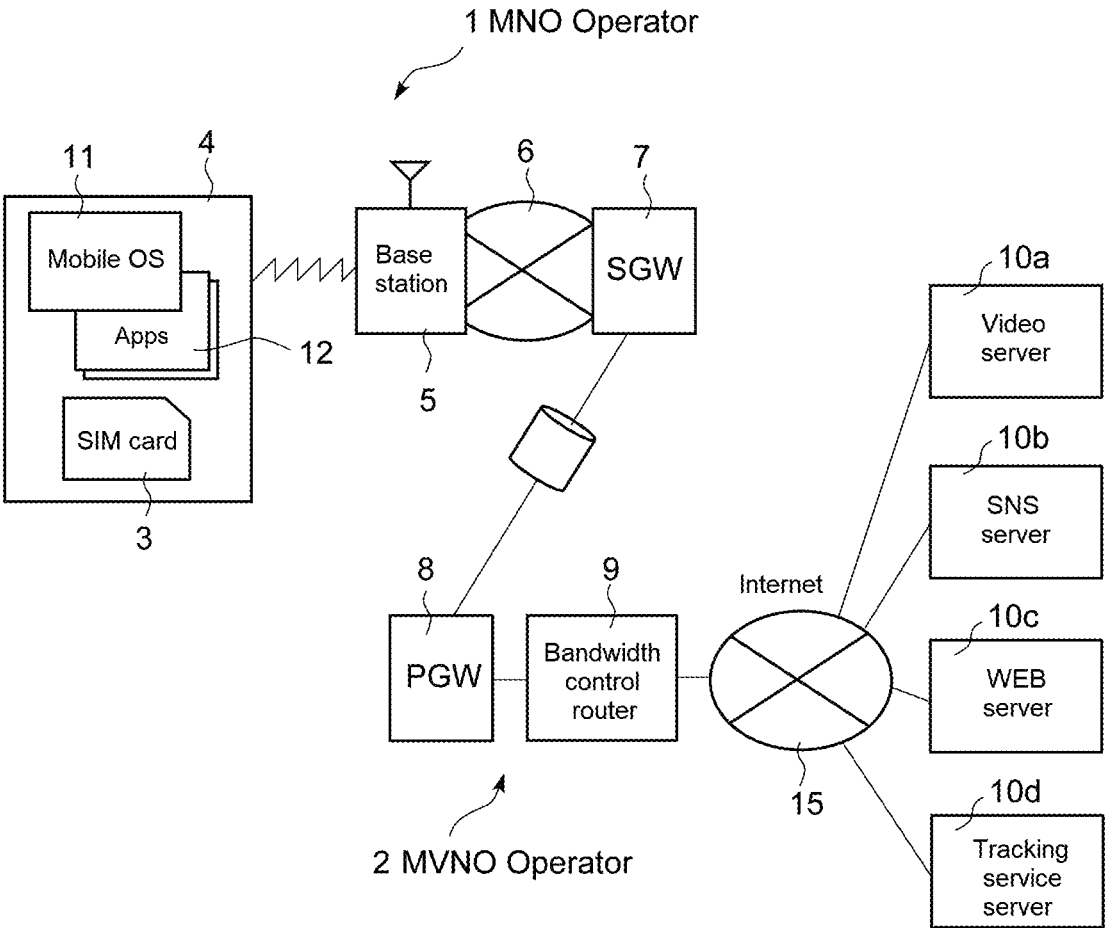
FIG. 1 is a schematic diagram of the overall structure of a system in accordance with one embodiment of the present invention.

In FIG. 1, 1 shows a mobile network system of an MNO operator and 2 shows a network connection system of an MVNO operator (the telecommunications operator of the present invention).

In this example, a user who has signed a contract with an MVNO operator and purchased a SIM card 3 places the SIM card 3 in his/her mobile communication terminal 4 for activation. This allows the mobile communication terminal 4 to be connected to an MNO operator's mobile network 6 via a base station 5, and then connected to various service-providing servers 10a-10d on the Internet via a service gateway 7 (SGW) on the MNO operator's side, and a packet data network gateway (PGW) 8 and bandwidth control router 9 on the MVNO operator's side.

A communication bandwidth, for example 100 Mbps, is configured to be secured between the service gateway 7 (SGW) on the MNO operator's side and the packet data network gateway (PGW) 8 on the MVNO operator's side based on a contract between the MNO operator and the MVNO operator. The MVNO operator's bandwidth control router 9 is configured to secure a necessary connection bandwidth based on the contract with the user of the SIM card 3 for data communication.

The user's mobile communication terminal 4 is a terminal having a SIM card (including an electric SIM (eSIM)) 3 installed therein and being operable for mobile communications. It is typically a smartphone or tablet, having a CPU, RAM, and ROM that are not shown. An operating system software program (hereinafter referred to as "OS") 11 such as iOS (trade name), Android (trade name), Windows (trade name) etc., and various application software programs (hereinafter simply referred to as "apps") 12 are installed in ROM. In addition, data to be used by the OS 11 and apps 12 are stored in ROM.

The applications 12 (apps) installed in the user's mobile communication terminal 4 include general apps such as a video software, IP phone, SNS application, browser, mailer, child tracking app, and the like, and the user can also freely install additional apps suitable for his/her own preferences and purposes. These apps 11 on the mobile communication terminal 4 are called and expanded in RAM and executed by the CPU as appropriate so that they can be connected to the applicable service servers 10a-10d via the mobile network of the MNO operator 1 and the network connection system of the MVNO operator 2 as well as the Internet 15.

The Characteristic Configuration of the Present Invention

Figure 2:
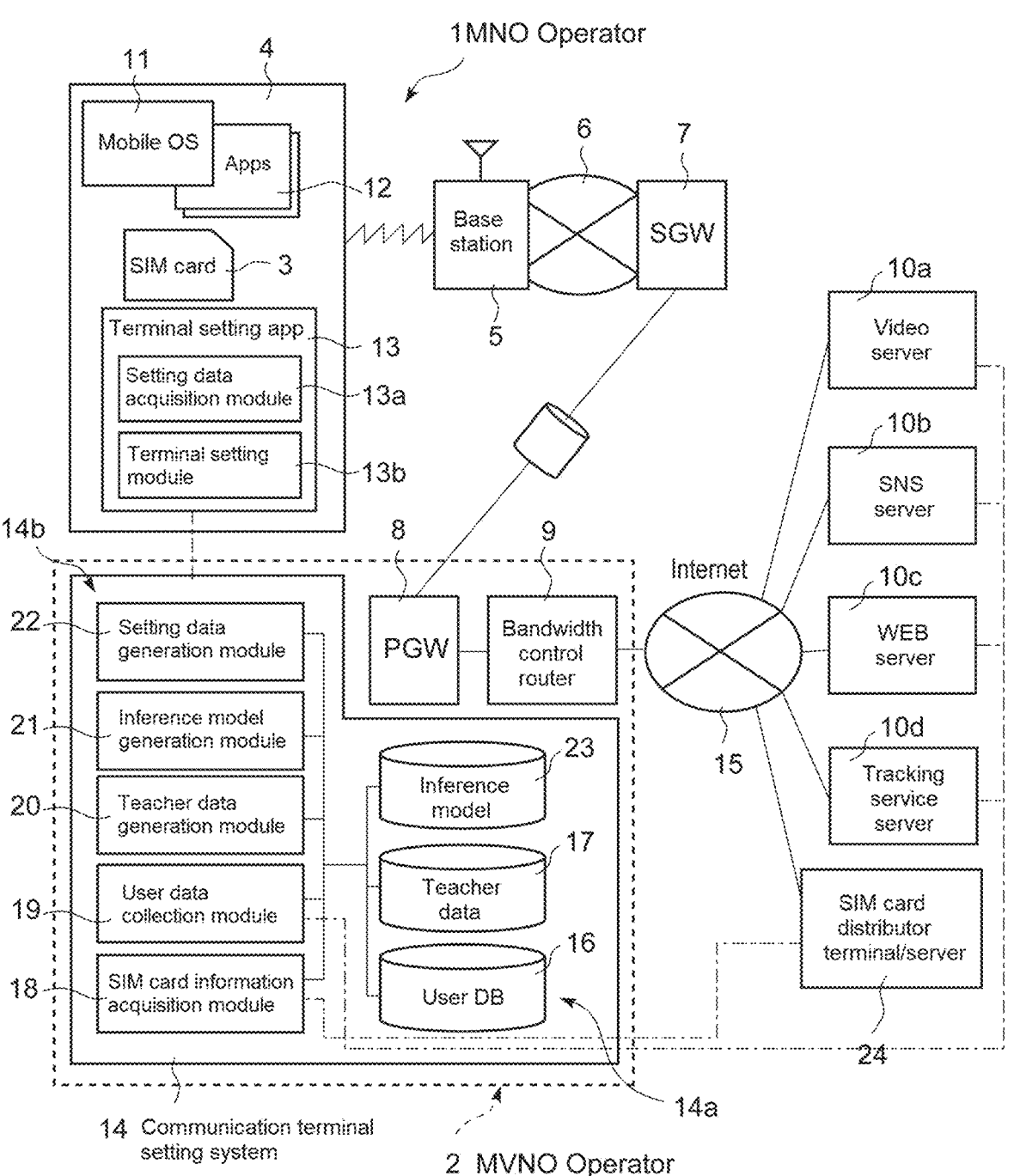
FIG. 2 is a schematic diagram of the overall structure of a system in accordance with the one embodiment of the present invention.

FIG. 2 is a block diagram illustrating the characteristic configuration of the present invention that is superimposed on the communication environment in the embodiment in accordance with the present invention shown in FIG. 1 above.

As shown in FIG. 2, in this embodiment of the present invention, a terminal setting app 13 is pre-installed in the user's mobile communication terminal 4 to which a SIM card 3 is attached, and a communication terminal setting system 14 is provided at the NVNO operator 2 that issued the SIM card to the user.

Terminal Setting App

The terminal setting app 13 in this embodiment is provided by the above MVNO operator itself to set up a communication terminal 4 that uses a SIM card 3 of the specific NVNO operator, and it is pre-installed in the terminal 4.

As shown in this figure, the terminal setting app 13 comprises two major components: a setting data acquisition module 13a and a terminal setting module 13b.

The setting data acquisition module 13a is configured to request "terminal setting data" for setting the communication terminal 4 from the communication terminal setting system 14, and receive the optimal setting data for the user. Furthermore, the terminal setting module 13b is configured to make various setting suggestions to the user on a user interface based on the received setting data, and to set up the communication terminal 4 in response to the user's approval.

Terminal Setting System on the Telecommunications Operator's Side

The communication terminal setting system 14 on the telecommunications operator side comprises a data storage unit 14a and a program storage unit 14b connected to a bus to which a CPU, RAM, and an output/input interface (not shown in the figure) are connected.

These data storage unit 14a and program storage unit 14b are in fact storage media such as a hard disk, SSD, etc., and the data and programs stored in them are called and expanded in RAM and executed by the CPU as appropriate, thereby constituting each functional part of the present invention.

To mention only the components relevant to the present invention, user database (DB) 17, teacher data 16, and an inference model 23 are stored in the data storage unit 14a.

To mention only the components relevant to the present invention, a SIM card information acquisition module 18, a user data collection module 19, a teacher data generation module 20, an inference model generation module 21, and a setting data generation module 22 are stored in the program storage unit 14b in addition to the OS not shown in the figure.

The details will be described below.

User Data and Teacher Data

First, as shown in FIG. 3, various user data is associated with the information of the SIM card 3 (such as a phone number) and stored in the user database 17. The user data stored here include subscriber attribute information acquired by the MVNO telecommunications operator 2 from the user when the SIM card 3 was issued, as well as actual user attribute information (user attribute information) acquired through the various services provided by the MVNO telecommunications operator 2 and information actually set by the user (user setting information). These subscriber attribute information, user attribute information, and user setting information are stored in association with the information of the SIM card 3 described above.

The teacher data 16 is the data in which the user setting information (user 1 setting information, user 2 setting information . . . ) stored the user database 17 is reconstructed in association with the setting items (items 1, 2, 3 . . . ) to be included in the "setting data." The setting items are defined in association with the model of the communication terminal 4 and the installed apps 12, and these setting items may be newly generated or updated as appropriate as new models or apps are introduced.

SIM Card Information Acquisition Module

The SIM card information acquisition module 18 is connected to a subscription terminal or server 24 of a distributor from which the user purchases a SIM card 3 to acquire SIM card information and store it in the user database 17.

The SIM card distributor 24 may be an online store as well as a physical store. When a user signs a contract for a new cell phone line at the distributor, the telecommunications operator issues the SIM card 3. The identification number of the subscriber (user), the cell phone number of the SIM card, and an email address (if an email address is given) are recorded in the SIM card 3. In addition, the subscriber attribute information and user attribute information that are necessary for the contract are obtained from the user when the contract is signed.

The information stored in the SIM card (SIM card information) and the subscriber attribute information and user attribute information are transmitted to the SIM card information acquisition module 18 through the SIM distributor terminal/server 24. The SIM card information acquisition module 18 then associates the user information with the unique information (such as a phone number) that identifies the SIM card, and write the user information to the user database 17.

User Data Collection Module

The user data collection module 19 collects data on the user from various web service servers 10a-10d provided by the MVNO telecommunications operator 2 and others, and stores it in the user database 17.

In other words, the user information is also collected by the service servers 10a-10d, which are used through the various apps 12 installed in the user's mobile communication terminal 4. In general, each app 12 is designed to allow various settings (user setting information) according to user attributes and preferences, depending on the services to be provided, and such information is also collected by the user data collection module 19.

However, in this embodiment, due to privacy information management restrictions, the information only from the service servers operated by the MVNO telecommunications operator 2 itself is configured to be collected among the various apps 12.

The user data collection module 19 performs data matching between the acquired user information (setting item names and setting contents) and the SIM card using the user's unique information, and associates the acquired user information with the SIM card information, and stores it in the user database 17.

Teacher Data Generation Module

The teacher data generation module 20 generates teacher data 16 used for inferring the setting data based on the user information stored in the user database 17.

In this example, the teacher data generation module 20 organizes the user information (user setting information) stored in the user database 17 according to the setting items of the mobile communication terminal 4 and various apps 12 to generate teacher data. The setting items of the mobile communication terminal 4 may be obtained from model information database (not shown in the figure), and the setting items of the apps may be obtained from each of the service servers.

In addition to the data generated by the teacher data generation module 20, the data generated by external information providers, etc. may be used for the teacher data.

The concept of the teacher data is described below using the tracking app/service provided by the tracking service server 10d as an example.

In this case, a tracking app is installed in the communication terminal 4 to track a specific user (for example, a child or elderly person in a family).

In this embodiment, the tracking app/service is operated and provided by the MVNO operator, and user setting information for the tracking service is collected by the user data collection module 19. This user setting information is then associated with the user information in the SIM card and stored in the user database 17.

Here, the user setting information includes the attribute information (age, gender, etc.) of the subscriber (a parent) as well as the attribute information (age, gender, etc.) of the person to be tracked, that is, the actual user (a child or elderly person). In addition, the items and values set by the subscriber/user in relation to this service are also stored in the user database 17. The setting items/values in this case may include basic settings (ON/OFF of the function itself, notification sounds, etc.), as well as settings related to the detection of smartphone zombie (for example, setting geofences on a map and notifying at the timing of entering/ exiting that location), and geo-fence settings/values.

In this case, the teacher data generation module 20 organizes the user setting information collected above by associating it with setting items (user attribute items and setting items related to the aforementioned tracking) and configures it into teacher data.

The setting items and setting values may include Android (registered trademark, OS) home screen settings, in which case the items related to the home screen display and the actual user setting values for those items are stored in the teacher data. In this example, the home screen may be set in relation to the tracking service, and when the subject is an elderly person, the home screen setting items may preferably be set together with the attributes of the subject, in which case the teacher data includes the user attributes and the OS settings.

Inference Model Generation Module

The inference model generation module 21 generates an inference model used for setting data items based on the teacher data 16 and stores it as an inference model 23 in the data storage unit 14a.

The inference model can be generated by various methods, but in this embodiment, it is generated by deep learning using a neural network.

As the user setting information (items and values) is updated, or new user setting information is added, the inference model generation module 21 updates the teacher data to the latest one by learning the updated or added information. For example, when the setting items are added or changed according to the model of apps 12 or terminal 4, they will be updated accordingly.

Setting Data Generation Module

The setting data generation module 22 identifies the user information in the user database 17 based on the information of the SIM card 3 received from the communication terminal 4, and authenticates the SIM card. And it applies the retrieved user information to the inference model 23 to generate setting data for the communication terminal 4.

In other words, the terminal setting app 13 installed in the communication terminal 4 sends the communication terminal setting system 14 a request for setting data together with the information stored in the SIM card 3, for example, the phone number associated with the SIM card. The setting data generation module 22 then retrieves the user information from the user database 17 based on the information of the SIM card 3 received from the communication terminal 4 and authenticates it. The user information is then applied to the inference model to generate and output setting data for the communication terminal 4.

An Example of Operation

An example of the operation of the communication terminal setting system 14 will be described below.

In this embodiment, the smartphone 4 or SIM card 3 is provided through the terminal/server 24 of the SIM card distributor, as described above.

In other words, the distributor let a salesperson or user to input the information necessary to set up a new contract through for example, the information input interface of the terminal/server 24.

In other words, upon entering into a contract, subscriber attribute information such as the name and address of the subscriber, and user attribute information such as desired ID and password for an email address with the distributor's domain (in this example, freebit.com), and desired ID and password for a cloud account are requested. When the user or distributor enters the information and clicks on OK, the information is acquired by the SIM card information acquisition module 18, and registered in the user database 17.

Then, the distributor terminal/server 24 assigns a new subscriber telephone number to the communication terminal 4 (the subscriber/user), and the SIM card 3 attached to the communication terminal 4 or the SIM card 3 alone is provided to the subscriber/user.

Figure 5:
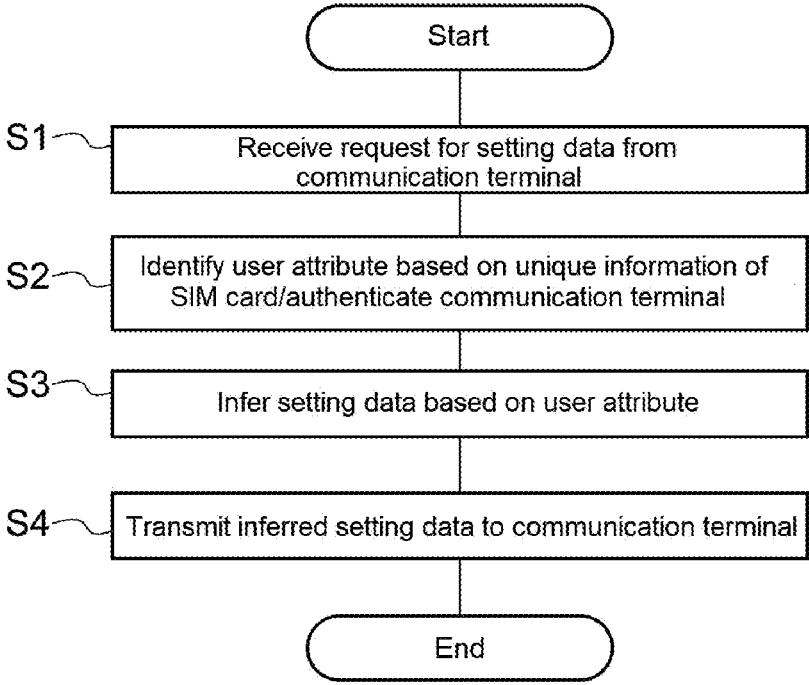
FIG. 5 is a flowchart that shows the operation in accordance with the one embodiment of the present invention.

Next, the operation of the communication terminal 4 at initial setup will be described below with reference to the flowchart in FIG. 5.

First, a new subscriber/user who receives the communication terminal 4 activates the communication terminal 4. In this example, when the communication terminal 4 is activated, the terminal setting app 13 is also automatically activated (step S1). The global IP address of the setting system 14 is stored in the setting app 13, and a connection between the setting app 13 and the communication terminal setting system 14 is established via the Internet.

In this case, the setting data generation module 22 receives a request for setting data for the communication terminal 4 from the setting data acquisition module 13a (step S1). The request contains the information of the user (including the subscriber/user), such as the phone number of the communication terminal 4 stored in the SIM card 3, and the setting data generation module first authenticates the SIM card/terminal based on this information. More specifically, it checks whether the received phone number and some of the subscriber/user information match the phone number, etc. stored in the user database 17.

Next, the setting data generation module 22 retrieves the user information (subscriber/user attributes) including the name, address, age, gender, etc. of the subscriber/user associated with the authenticated phone number, etc. from the user database 17 (step S2). The setting data generation module 22 applies the retrieved user information to the inference model to obtain setting data as the output, consisting of setting items and setting values of the setting items (step S3).

The setting data is transmitted from the setting data generation module 22 to the communication terminal 4 and received by the setting data acquisition module 13a of the communication setting app 13 (step S4).

Then, the terminal setting module 13b displays the settings based on the received setting data on the communication terminal 4. If the user (the subscriber/user) agrees to the settings, the terminal setting module 13b configures the settings of the communication terminal 4 and the apps based on the setting data.

According to the above configuration using the SIM card as the starting point, it is possible to set the communication terminal according to the user attributes regardless of the model of the communication terminal, whether it is a smartphone or any other type of IoT device.

The setting items for the communication terminal 4 include not only the settings for the communication terminal itself and the cloud account settings for the operating system, but also the setting items related to various apps.

In this embodiment, for example, a tracking app/service that can track a child and elderly person is described as an example of an app/service, and as mentioned above, there are a wide variety of setting items for such an app/service. For example, such setting items may include restrictions on the use of app on the communication terminal 4, detection of smartphone zombie, geo-fence settings for "entering" and "leaving" a set area, notification styles for inappropriate images taken, and the like.

These setting items are set manually by the subscriber or user, and when they are being set, it is necessary to take into account the age, gender, residential area, etc. of the subject (child) to be tracked as appropriate. However, conventional apps have only provided general and fixed initial settings.

In contrast, in accordance with the embodiment of the present invention, it is possible to suggest more appropriate settings through inference based on the user's data using artificial intelligence.

The present invention is not limited to the above embodiment, and various modifications can be made within the spirit of the invention.

For example, in the above embodiment, the communication terminal 4 was a smartphone, but it is not limited to a smartphone. For example, the communication terminal 4 may be an IoT device such as a home appliance that can be connected to the Internet. In this case, the user of the IoT device need not be an actual person. In this case, the IoT device itself that is associated with a SIM card subscriber can be the user.

In this case, at a minimum, the IoT device may be configured to request setting data based on the SIM card's unique information to the communication terminal setting system; receive the setting data from the communication terminal setting system; and set the IoT device itself.

Furthermore, in the above embodiment, although the setting items and setting values of the tracking app/service and the setting items and setting values of the home screen are used as examples of the setting data for setting the communication terminal 4, the present invention is not limited to these setting items and setting values.

In the above embodiment, although the communication terminal setting system is provided at the MVNO operator or MNO operator itself that issues the SIM card, the present invention is not limited to such a configuration. It may be provided to other operators issuing the above SIM cards or to manufacturers producing the communication terminal, and the like in the form of OEM.

Furthermore, in the above embodiment, although the SIM card is authenticated using the phone number and user information stored in the SIM card, authentication may also be performed using the unique information of the communication terminal to be authenticated in addition to such information.

DESCRIPTION OF THE REFERENCE NUMBERS

1. MNO operator
2. MVNO operator
3. SIM card
4. Mobile communication terminal
5. Base station
6. Mobile network
7. Service gateway
8. Packet data network gateway
9. Bandwidth control router
10a-10d. Service servers
10d. Tracking service server
11. OS
12. Apps
13. Terminal setting app
13a. Setting data acquisition module
13b. Terminal setting module
14. Communication terminal setting system
14a. Data storage unit
14b. Program storage unit
15. Internet
16. Teacher data
17. User database
18. SIM card information acquisition module
19. User data collection module 20. Teacher data generation module
21. Inference model generation module
22. Setting data generation module
24. SIM card distributor terminal/server

What is claimed is:

1. A communication device setting system for setting up a communication device with a SIM card mounted thereon, the system being configured to cause a computer of the communication device setting system to execute:

(1) a setting data receiving step for receiving, from the communication device with the SIM card mounted thereon a request for setting data for setting up the communication device;

(2) a user attribute identification step for identifying attribute information of a user of the SIM card based on unique information of the SIM card included in the request;

(3) a setting data inference step for applying the identified attribute information of the user to an inference model to determine setting data for the communication device, wherein the computer comprises teacher data for generating the inference model, wherein the teacher data is the data in which setting information of the communication device set by a plurality of SIM card users is reconstructed in association with the setting items and their setting values, and wherein the setting items of the communication device are defined in association with a model of the communication device and application software programs installed on the communication device; and (4) a setting data transmission step for transmitting the determined setting data to the communication device.

2. The communication device setting system of claim 1, wherein in the user attribute identification step, the computer authenticates the SIM card, and identifies the attributes of the user, the system further comprising:

a user database for storing information of SIM card subscribers and users for the authentication and the identification.

3. The communication device setting system of claim 1, wherein the system is configured to cause the computer to further execute an inference model generation step for generating and updating the inference model used in the setting data inference step, wherein the inference model is generated and updated using deep learning based on a neural network.

4. The communication device setting system of claim 1, wherein the system is configured to cause the computer to further execute a user data collection step for collecting the data on setting items and setting values of the communication device set by the SIM card users.

5. The communication device setting system of claim 4, wherein the setting items and the setting values of the communication device are collected from service servers on the Internet in the user data collection step.

6. The communication device setting system of claim 4, wherein the system is configured to cause the computer to further execute a teacher data generation step for continuously updating the teacher data based on the setting items and the setting values collected in the user data collection step.

7. The communication device setting system of claim 1, wherein the setting data are setting items and setting values related to a home screen.

8. The communication device setting system of claim 1, wherein the setting data are setting items and setting values related to a tracking app/service for tracking behavior of the user of the communication device.

9. The communication device setting system of claim 1, further comprising:

a communication device side setting system installed in the communication device, the communication device side setting system being configured to cause a computer to execute the steps of:

requesting setting data from the communication device setting system; and setting up the communication device and the application software programs based on the setting data received from the communication device setting system.

10. The communication device setting system of claim 1, the communication device is an IoT device capable of mobile communications by itself.

11. A method executed by a communication device setting system for setting up a communication device with a SIM card mounted thereon, the method comprising:

(1) a setting data receiving step for receiving by a computer of the communication device setting system, a request from the communication device with the SIM card mounted thereon for setting data for setting up the communication device;

(2) a user attribute identification step for identifying by the computer, attribute information of a user of the SIM card based on unique information of the SIM card included in the request;

(3) a setting data inference step for applying by the computer, the identified attribute information of the user to an inference model to determine setting data for the communication device, wherein the computer comprises teacher data for generating the inference model, wherein the teacher data is the data in which setting information of the communication device set by a plurality of SIM card users is reconstructed in association with the setting items and their setting values, and wherein the setting items of the communication device are defined in association with a model of the communication device and application software programs installed in the communication device; and (4) a setting data transmission step for transmitting by the computer, the determined setting data to the communication device.

12. The method of claim 11, wherein in the user attribute identification step, the computer authenticates the attributes of the user from a user database for identifying the attributes of the user of the SIM card.

13. The method of claim 12, further comprising an inference model generation step for generating and updating by the computer, the inference model used in the setting data inference step, wherein the inference model is generated and updated using deep learning based on a neural network.

14. The method of claim 11, further comprising a user data collection step for collecting by the computer, the data on setting items and setting values of the communication device set by the SIM card users to generate the teacher data.

15. The method of claim 14, wherein the setting items and the setting values of the communication device is collected from service servers on the Internet in the user data collection step.

16. The method of claim 14, further comprising teacher data generation step for continuously updating by the computer, the teacher data based on the setting items and the setting values collected in the user data collection step.

17. The method of claim 11, wherein the setting data are setting items and setting values related to a home screen.

18. The method of claim 11, comprising a method executed by a communication device side setting system installed in the communication device, the method comprising the steps of:

requesting by a computer, setting data from the communication device setting system; and setting up by the computer, the communication device and the application software programs based on the setting data received from the communication device setting system.

* * * * *